United States Patent
Nakada et al.

(10) Patent No.: US 8,254,745 B2
(45) Date of Patent: Aug. 28, 2012

(54) OPTICAL DEVICE, OPTICAL INTEGRATED DEVICE, AND METHOD OF MANUFACTURING THE SAME

(75) Inventors: Masafumi Nakada, Tokyo (JP); Takanori Shimizu, Tokyo (JP)

(73) Assignee: NEC Corporation, Tokyo (JP)

( * ) Notice: Subject to any disclaimer, the term of this patent is extended or adjusted under 35 U.S.C. 154(b) by 397 days.

(21) Appl. No.: 12/670,460

(22) PCT Filed: Jul. 11, 2008

(86) PCT No.: PCT/JP2008/062969
§ 371 (c)(1), (2), (4) Date: Jan. 27, 2010

(87) PCT Pub. No.: WO2009/016972
PCT Pub. Date: Feb. 5, 2009

(65) Prior Publication Data
US 2010/0158430 A1 Jun. 24, 2010

(30) Foreign Application Priority Data

Aug. 1, 2007 (JP) ................................ 2007-200405

(51) Int. Cl.
G02B 6/00 (2006.01)
G02B 6/12 (2006.01)
G02B 6/10 (2006.01)
(52) U.S. Cl. ........................... 385/141; 385/14; 385/130
(58) Field of Classification Search .................. 385/130, 385/141
See application file for complete search history.

(56) References Cited

U.S. PATENT DOCUMENTS
2005/0089258 A1* 4/2005 Kim et al. ......................... 385/6

FOREIGN PATENT DOCUMENTS
| JP | 7-56040 A | 3/1995 |
| JP | 8-253395 A | 10/1996 |
| JP | 10-221720 A | 8/1998 |
| JP | 2001003180 A | 1/2001 |
| JP | 2002235181 A | 8/2002 |
| JP | 2004240003 A | 8/2004 |
| JP | 2005181995 A | 7/2005 |
| WO | 2007083842 A | 7/2007 |

OTHER PUBLICATIONS

International Search Report for PCT/JP2008/062969 mailed Oct. 14, 2008.
T. Shintaku, "Integrated optical isolator based on efficient nonreciprocal radiation mode conversion", Applied Physics Letters, vol. 73, No. 14, Oct. 5, 1998, pp. 1946-1948.
N. Sugimoto et al . "A Hybrid Integrated Waveguide Isolator on a Silica-Based Planer Lightwave Circuit", Journal of Lightwave Technology, vol. 14, No. 11, Nov. 1996, pp. 2537-2546.
S. Y Sung et al., "Integrating yttrium iron garnet onto nongarnet substrates with faster deposition rates and high reliability", Applied Physics Letters 87, 2005, 121111-1-3.

(Continued)

Primary Examiner — Omar Rojas

(57) ABSTRACT

At least part of an optical device comprises an optical waveguide of a magneto-optical material. The magneto-optical material comprises a polycrystalline material having no lattice matching with an underlayer material. The optical waveguide exhibits no magnetic anisotropy due to an inverse magnetostriction effect caused by thermal strain. The magnetization direction of the optical waveguide is aligned with a traveling direction of light passing through the waveguide by shape magnetic anisotropy.

14 Claims, 2 Drawing Sheets

OTHER PUBLICATIONS

J. Akedo et al., "Microstructure and Electrical Properties of Lead Zirconate Titanate (Pb(Zr52/li48)O3) Thick Films Deposited by Aerosol Deposition Method", Japanese Journal of Applied Physics, vol. 38, Part 1, No. 96, Sep. 1999, pp. 5397-5401.

M. Nakada et al., "Optical and electro-optical properties of Pb(Zr,Ti)O3 and (Pb,La)(Zr,Ti)O3 films prepared by aerosol deposition method", Journal of Crystal Growth, 275 (2005), pp. e1275-e1280, 2004.

Y. Yamamoto et al., "Fabrication of Bi,YIG/Al2O3" composite films with aerosol deposition method and their properties, Papers of Technical Meeting on Magnetics, MAG, IEE Japan, Jul. 24, 2007, vol. 71, pp. 19-22.

* cited by examiner

OPTICAL DEVICE, OPTICAL INTEGRATED DEVICE, AND METHOD OF MANUFACTURING THE SAME

This application is the National Phase of PCT/JP2008/062969, filed Jul. 11, 2008, which claims the benefit of priority from Japanese patent application No. 2007-200405, filed on Aug. 1, 2007, the disclosure of which is incorporated herein in its entirety by reference.

TECHNICAL FIELD

The present invention relates to an optical device used for optical communication, optical wiring, or optical storage, and more particularly to an optical device using optical nonreciprocity and polarization rotation with use of an optical waveguide of a magneto-optical material, an optical integrated device into which such an optical device is integrated, and a method of manufacturing the same.

BACKGROUND ART

The present invention relates to an optical device using optical nonreciprocity and polarization rotation with use of an optical waveguide of a magneto-optical material. First, an optical isolator will be described as a typical example of an optical device using optical nonreciprocity.

An optical isolator is an element having a function of allowing light to pass only in one direction and blocking light propagating in an opposite direction. When an optical isolator is provided on an emission end of a semiconductor laser, light emitted from the laser passes through the optical isolator, so that the emitted light can be used as a light source for optical fiber communication. Light that is to enter into the semiconductor laser through the optical isolator is blocked by the optical isolator, so that it cannot enter into the semiconductor laser. If an optical reflection feedback enters into the semiconductor laser, the lasing characteristics of the semiconductor laser are deteriorated. Thus, the optical isolator blocks an optical reflection feedback, so that the semiconductor laser can maintain stable oscillation without deterioration of its characteristics.

If light enters in a direction opposite to an intended direction not only in a semiconductor laser, but also in a photoactive element such as an optical amplifier, then operational characteristics of the element are deteriorated. Since an optical isolator allows light to pass only in one direction, it can prevent light from entering into a photoactive element in a direction opposite to an intended direction. Optical isolators have widely been used for optical communication and the like.

All optical isolators currently being in practical use have no function of confining light within a cross-section perpendicular to a light propagation direction at a region through which the light passes. That is, they have no structure of waveguide effects. Those optical isolators are referred to as bulk optical isolators. It is difficult to integrate a bulk optical isolator with other waveguide elements such as a semiconductor laser. A bulk optical isolator is formed by integration of bulk elements including a polarizer, a nonreciprocal element of a magneto-optical material, a magnet for generating a magnetic field to control the magnetization direction of the magneto-optical material, and an analyzer.

Meanwhile, for integration with other optical elements, there have been proposed some optical isolators having waveguide effects, i.e., waveguide optical isolators. Those waveguide optical isolators use a waveguide of a magnetic garnet that has epitaxially been grown on a garnet substrate such as gadolinium gallium garnet (GGG). In Patent Document 1 (Japanese laid-open patent publication No. 7-56040), an iron garnet containing La, Ga, and Y is grown on a GGG substrate by a liquid phase epitaxial growth (LPE) method. An index of refraction is controlled by controlling the composition of a core layer and a clad layer, so that a waveguide layer is formed. Furthermore, a ridge portion is formed by wet etching to form a waveguide. The magnetization direction of the core layer is controlled by application of a magnetic field, and the nonreciprocity is measured.

Similarly, in Non-Patent Document 1 (T. Shintaku, Appl. Phys. Lett. 73 (1998) 1946), a Ce-substituted YIG garnet film is epitaxially grown with (111) on a GGG substrate to which Ca, Mg, and Zr have been added by an RF sputtering method. A ridged waveguide is formed by reactive ion etching. In order to cause isolation due to nonreciprocity, a specific angle should be formed between the light waveguide direction and the magnetization direction. The magnetization direction is controlled by an external magnetic field of a magnet.

Thus, in order to use a waveguide of a magneto-optical material as an optical device, the magnetization direction should be controlled by an external magnetic field. In view of size reduction and cost reduction of an optical device, it is desired to control the magnetization direction with a small external magnetic field or preferably without any magnetic field. For this purpose, the magnetic anisotropy of the formed magneto-optical material should be controlled precisely. A magneto-optical material that has epitaxially been grown exhibits strong growth induced magnetic anisotropy. Patent Document 2 (Japanese laid-open patent publication No. 8-253395) discloses a technique of heat treatment under at least 1000° C. in order to reduce such magnetic anisotropy. However, heat treatment of at least 1000° C. is excessively high in temperature as a process temperature of an optical waveguide device.

Patent Document 3 (Japanese laid-open patent publication No. 10-221720), which provides a waveguide optical part having a switching function, discloses a waveguide of a magnetic garnet, which is a magneto-optical material. The magnetic garnet waveguide is in the form of a rectangular parallelepiped elongated along an optical path, and the magnetization direction has a tendency to become parallel to a light traveling direction because of its shape magnetic anisotropy. Therefore, no magnet is required to control the magnetization direction of a waveguide formed of a magneto-optical material in a polarization rotation portion. However, since the magnetic garnet waveguide is epitaxially grown on a substrate, it exhibits strong growth induced magnetic anisotropy. Accordingly, it is difficult to control the magnetization direction without any external magnetic field of a magnet only by using the shape magnetic anisotropy. Thus, reduction or long-term variations of a polarization rotation angle disadvantageously occur.

Future achievement of nanophotonic devices in which optics and electronics are integrated on one chip has been demanded as great innovation technology. This achievement requires a technique of forming an LSI, such as a CPU or a memory, and a photoactive element, such as an optical switch or a laser, on the same substrate. A hybrid-type optical nonreciprocal element has been proposed as an optical nonreciprocal element on a silicon substrate. An optical reciprocal element is formed by a nonreciprocal mode converter and a reciprocal mode converter. A magnetic garnet waveguide is used only for the nonreciprocal portion. A half-wave plate is inserted in the reciprocal portion. All parts individually produced (the polarizer, the nonreciprocal mode converter, and the reciprocal mode converter) are inserted in a silica-based waveguide produced on a silicon substrate and fixed by ultraviolet-curing resin, so that the optical nonreciprocal element is produced. Insertion of the parts causes insertion loss at each portion. Additionally, this technology is disadvantageous in that it is extremely difficult to position the nonreciprocal mode converter with respect to the silica-based waveguide (see Non-Patent Document 2: N. Sugimoto et al., J. Lightwave Tech. 14 (1996) 2537).

Furthermore, Patent Document 4 (Japanese laid-open patent publication No. 2004-240003) discloses a technique of joining a magneto-optical material by wafer bonding, as a technique of forming a magneto-optical element on different types of substrates. In Patent Document 4, an SOI substrate and a second clad layer of a magnetic garnet are joined together by wafer bonding. In the SOI substrate, three layers including a core layer of silicon crystal, a first clad layer of $SiO_2$, which is an insulating material, and a holder for holding the core layer and the first clad layer are stacked while the first clad layer of $SiO_2$ is located as an intermediate layer. There is disclosed a magneto-optical waveguide having a structure of magnetic garnet/silicon/silicon dioxide in which the second clad layer of a magnetic garnet is attached to a surface of the core layer of the SOI substrate. In this case, the magnetization direction of the bonded magnetic garnet should also be controlled by an external magnetic field. Additionally, since a monocrystalline magnetic garnet is joined, this technology is disadvantageous in that size reduction is difficult and that the cost increases.

For integration on a silicon substrate, there has been demanded a technique of depositing a magneto-optical material with high crystallinity on a silicon or quartz substrate. A method of forming a YIG garnet film on MgO and $SiO_2$ by sputtering has been reported in Non-Patent Document 3 (S. Y. Sung et al., Appl. Phys. Lett. 87 (2005) 12111). An amorphous film is formed on a substrate and crystallized by annealing with an RTA method to form polycrystals. The crystallization requires a high annealing temperature of at least 750° C. Because there is a difference in coefficient of thermal expansion between the substrate and the YIG garnet, inverse magnetostriction effects due to thermal strain by the annealing cause magnetic anisotropy. Therefore, a magnet is required for magnetization control of the waveguide.

Meanwhile, aerosol deposition (AD method) using a room temperature impact consolidation phenomenon has been developed as new film formation technology for oxides. The AD method employs a collision adhesion phenomenon of ultra-fine particulate materials. There has been expected achievement of a higher deposition rate and a lower process temperature as compared to conventional thin film formation methods (Non-Patent Document 4: Jun Akedo et al., Jpn. J. Appl. Phys. 38 (1999) 5397). Furthermore, because film characteristics do not depend upon an underlayer, any substrate can be selected in the AD method. The technique disclosed in Patent Document 5 (Japanese laid-open patent publication No. 2001-3180) relates to a formation method using an AD method. Mechanical impact is applied to ultra-fine brittle particulate materials supplied onto a substrate, thereby pulverizing the materials. Thus, the ultra-fine brittle particulate materials are joined together. Alternatively, the ultra-fine brittle particulate materials are joined together, and the ultra-fine brittle particulate materials and the substrate are joined together. With this method, it is possible to achieve bonding of ultra-fine particles and form a film at a high density with high strength without heating.

The technique disclosed in Patent Document 6 (Japanese laid-open patent publication No. 2002-235181) relates to a structure formed by an AD method. The structure is formed of polycrystal having no crystal orientation. Use of this AD method has been examined for thin film formation of an electro-optical material having high transparency (Non-Patent Document 5: Masafumi Nakada et al., J. of Crys. Growth, 275 (2005) 1275). The document has clarified that transmission loss of an AD film, which is a fundamental characteristic of an optical element, is caused by the Rayleigh scattering of fine particles forming a molded body and fine particles of an unmolded body having a different index of refraction.

The technique disclosed in Patent Document 7 (Japanese laid-open patent publication No. 2005-181995) relates to an optical element produced by an AD method, an optical integrated device, an optical information transmission system, and a method of manufacturing the same. An optical element is formed by an impact consolidation phenomenon in which mechanical impact is applied to ultra-fine brittle particulate materials supplied onto a substrate so that the ultra-fine brittle particulate materials are pulverized and bonded to each other for thereby forming a molded body. Pores included in the optical element and indexes of refraction of different phases have the relationship with an average diameter d (nm) of a portion different from a primary portion of the molded body and a wavelength $\lambda$ (nm) of light propagating through the molded body such that $d^6/\lambda^4 < 4 \times 10^{-5}$ $nm^2$.

An isolator has been described as an example of a device using nonreciprocity. Other optical nonreciprocal devices include an optical circulator. An optical circulator is formed by a magneto-optical waveguide as with an optical isolator. Furthermore, a polarization direction of light propagating through a waveguide can be controlled by using the polarization rotation of a magneto-optical material. Therefore, it is possible to form an optical device such as a polarization equalizer.

DISCLOSURE OF INVENTION

Problem(s) to be Solved by the Invention

As described above, waveguide devices using a magneto-optical material have been studied for a long time. Nevertheless, waveguide devices using a magneto-optical material have not been put into practical use for the following reasons. A magnetic garnet used as a magneto-optical material should be formed on a substrate. However, it is difficult to attain crystal growth of a magnetic garnet on a monocrystalline substrate such as GGG. Alternatively, since high-temperature annealing is required, it is difficult to achieve integration with a waveguide including $SiO_2$, Si, III-V compound semiconductor, or the like as a base material. Therefore, there are no advantages of waveguide devices (such as size reduction or cost reduction). Additionally, magnetic anisotropy is caused by a formation process, and an external magnetic field is required for control of the magnetization direction. Integration of a magnet required to generate an external magnetic field complicates an optical device and increases cost of an optical device.

The present invention has been made in view of the aforementioned drawbacks in the prior art. It is an object of the present invention to provide a magneto-optical waveguide that exerts great magneto-optical effects and facilitates integration with other optical elements, an optical device using such a magneto-optical waveguide, and an optical integrated device obtained by integrating such a magneto-optical waveguide and an optical device with other semiconductor optical elements.

Means to Solve the Problem(s)

An optical device according to the present invention is characterized in that at least part of the optical device comprises an optical waveguide of a magneto-optical material. The magneto-optical material comprises a polycrystalline material having no lattice matching with an underlayer material. The optical waveguide exhibits no magnetic anisotropy due to an inverse magnetostriction effect caused by thermal strain. The magnetization direction of the optical waveguide is aligned with a traveling direction of light passing through the waveguide by shape magnetic anisotropy.

Furthermore, an optical integrated device according to the present invention is characterized in that the optical device having an optical waveguide structure including a waveguide layer of the magneto-optical material is integrated with a second optical device on a substrate. The second optical device comprises one of a laser, an electro-optic transducer, a photoelectric transducer, an optical amplifier, an optical switch, and an optical filter. Moreover, instead of the second optical device, an electronic circuit may be integrated on a substrate.

Furthermore, a manufacturing method according to the present invention is characterized in that the magneto-optical material is formed by an aerosol deposition method.

Effect(s) of the Invention

The present invention can provide a magneto-optical waveguide that exerts great magneto-optical effects and facilitates integration with other optical elements, an optical device using such a magneto-optical waveguide, and an optical integrated device obtained by integrating such a magneto-optical waveguide and an optical device with other optical elements and semiconductor optical elements.

BEST MODE FOR CARRYING OUT THE INVENTION

An example of the present invention, including its principle, will be described below in detail with reference to the drawings.

Example 1

Figure 1:
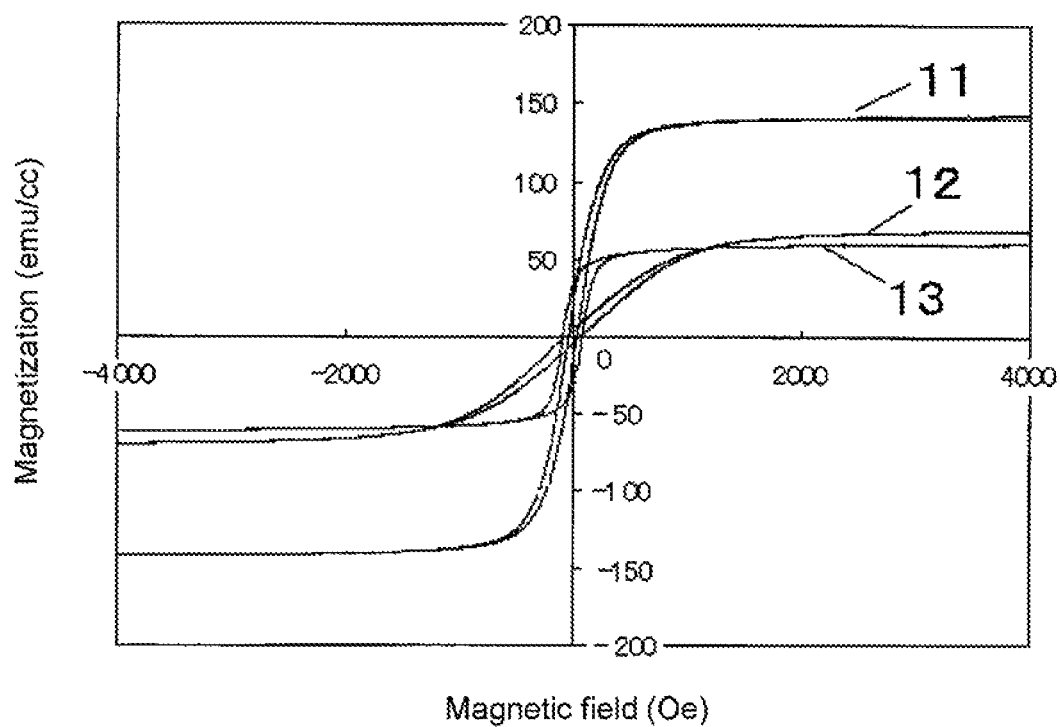
FIG. 1 is a diagram showing a magnetization curve of a Bi-substituted YIG garnet.
Figure 2:
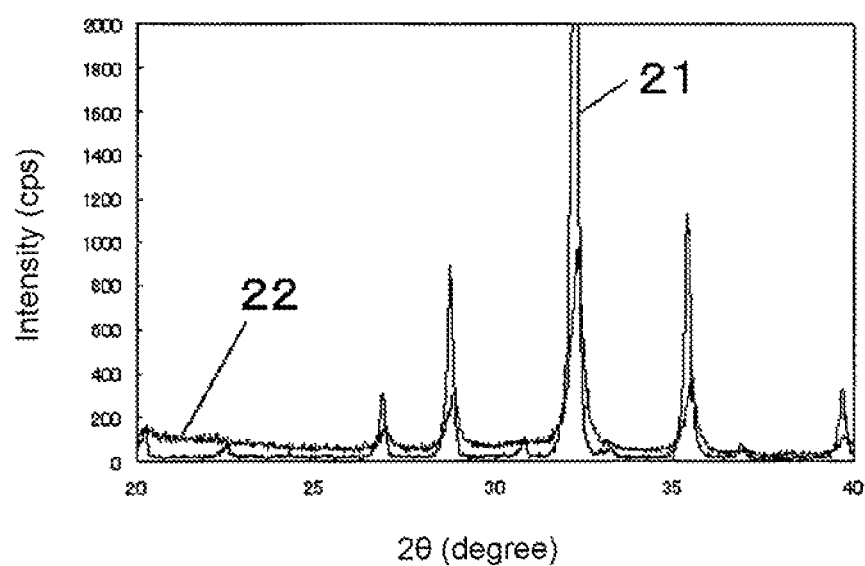
FIG. 2 is a diagram showing an X-ray diffraction pattern of the Bi-substituted. YIG garnet.
Figure 3:
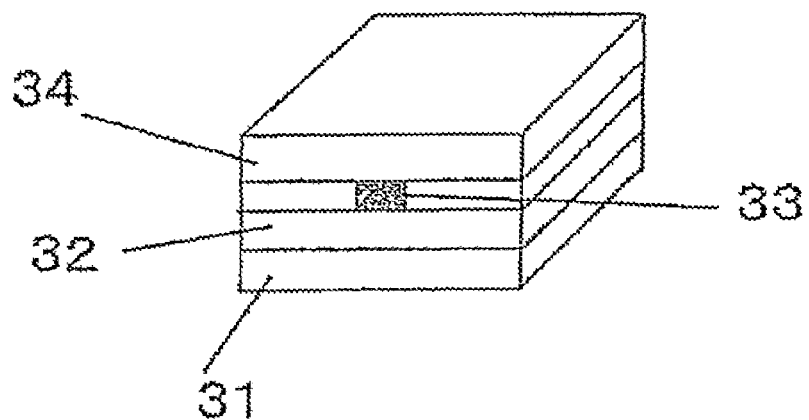
FIG. 3 is a schematic view of an optical waveguide using a magneto-optical material.
Figure 4:
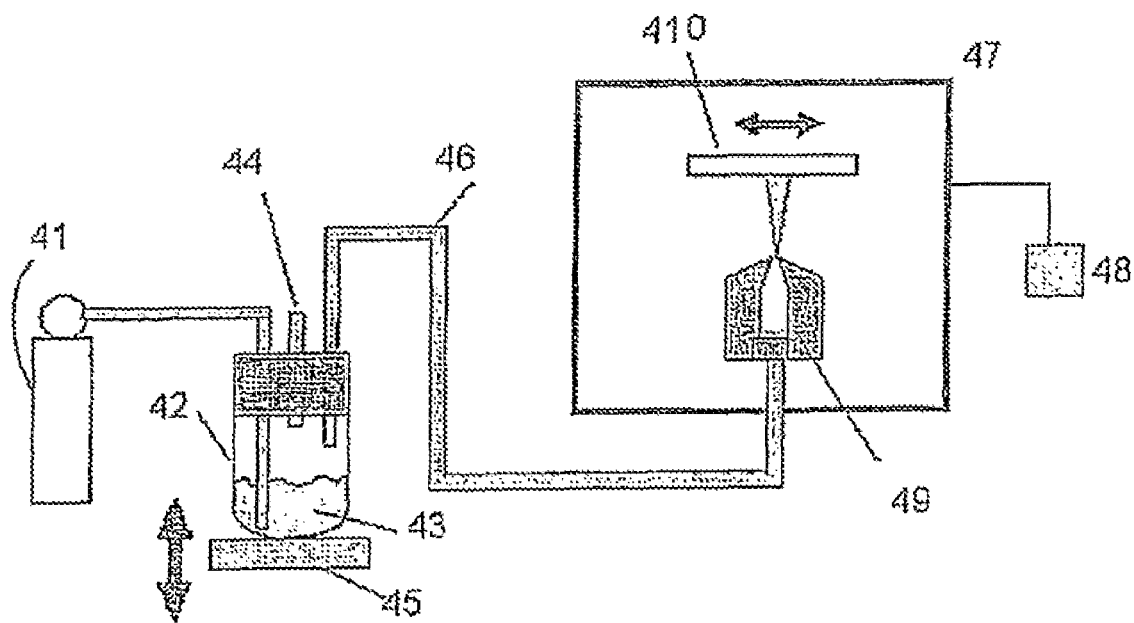
FIG. 4 is a schematic view of a deposition apparatus used in the present invention.

An example will be described below in detail with reference to FIGS. 1 to 4. FIG. 1 shows a magnetization curve of a Bi-substituted YIG garnet. FIG. 2 shows an X-ray diffraction pattern of the Bi-substituted YIG garnet. FIG. 3 is a schematic view of an optical waveguide using a magneto-optical material according to the present example. FIG. 4 is a schematic view of a deposition apparatus used in the present invention.

The present invention pays attention to the fact that a control of magnetic anisotropy of a waveguide is important to manufacture a waveguide device of a magneto-optical material that is operable without any magnet on any desired underlayer material. When a waveguide is formed without annealing by using a magneto-optical material of a polycrystalline material having no lattice matching with an underlayer material, then magnetic anisotropy other than shape magnetic anisotropy can be reduced. Thus, the magnetization direction of an optical waveguide can be aligned with a traveling direction of light passing through the waveguide without any magnet by the shape magnetic anisotropy. The present invention has been made based on those findings. The magnetic anisotropy of a magnetic garnet used as a magneto-optical material mainly includes the following four types: magnetocrystalline anisotropy, growth induced magnetic anisotropy, magnetic anisotropy due to inverse magnetostriction effects, and shape magnetic anisotropy. Physical background and a control method of each type of magnetic anisotropy will be described below.

The magnetocrystalline anisotropy arises depending upon electron states of magnetic atoms due to a crystal structure. Since a magnetic garnet has a cubic structure having high crystal symmetry, the magnetocrystalline anisotropy does not become a large value. Furthermore, the spatial average can be made zero in a case of polycrystal.

The growth induced magnetic anisotropy is magnetic anisotropy that arises during epitaxial growth. It has been known that the growth induced magnetic anisotropy becomes large when a magnetic garnet includes two or more kinds of nonmagnetic metal ions. There has been considered coordination of nonmagnetic metal ions to a direction of crystal growth, the origin of which is not clear. In many cases, a Bi-substituted YIG garnet, which exerts great magneto-optical effects, is used as a magneto-optical material, and its growth induced magnetic anisotropy becomes large. In order to reduce this magnetic anisotropy, it is effective to avoid epitaxial growth as a method of formation. Heat treatment of at least 1000° C., which is disclosed in Patent Document 2, is effective to reduce the growth induced magnetic anisotropy. However, heat treatment of at least 1000° C. is excessively high in temperature as a process temperature of an optical waveguide device.

The magnetic anisotropy due to inverse magnetostriction effects is a phenomenon caused by influence of electron states of magnetic atoms due to crystal strain. The magnetic anisotropy due to inverse magnetostriction effects of a Bi-substituted YIG garnet is a relatively large effect. It is effective to reduce crystal strain in order to reduce this magnetic anisotropy. In the case of epitaxial growth, crystal strain is produced by a mismatch in a lattice constant between an underlayer material. Furthermore, when annealing or a high substrate temperature is required during the formation, crystal strain is produced due to thermal strain caused by a mismatch in a coefficient of thermal expansion between an underlayer material and a magneto-optical material. Accordingly, in order to reduce this magnetic anisotropy, it is effective to use a method of formation that can reduce a mismatch in a lattice constant between an underlayer material and requires no thermal process.

The shape magnetic anisotropy is a phenomenon in which the magnetization direction is oriented to a direction in which magnetostatic energy due to a demagnetizing field is reduced. The shape magnetic anisotropy largely depends upon the shape of a magnetic material. In a case of a plane such as a thin film, the shape magnetic anisotropy becomes large along an in-plane direction. In a case of a columnar structure, the shape magnetic anisotropy becomes large along a longitudinal direction.

From the aforementioned examination of the magnetic anisotropy, the inventors have found the following manufacturing method as a method of manufacturing a waveguide device of a magneto-optical material on any desired underlayer material. Specifically, the magnetic anisotropy other than the shape magnetic anisotropy can be reduced when a waveguide is formed without annealing by using a magneto-optical material of a polycrystalline material having no lattice matching with an underlayer material. As a result, it is possible to obtain a waveguide device that is operable without any magnet and has small magnetic anisotropy. Furthermore, as a result of study of various deposition methods, the inventors have found that a magneto-optical material suitable for a waveguide can be formed by an aerosol deposition (AD) method. Characteristics of a magneto-optical film formed by an aerosol deposition (AD) method will be described in detail with reference to the drawings.

FIG. 1 shows a magnetization curve of a Bi-substituted YIG garnet. The composition of the Bi-substituted YIG garnet (Bi-YIG) was $(Bi_{0.8}Y_{2.2})Fe_5O_{12}$. The reference numeral 11 denotes a magnetization curve of material powder, the reference numeral 12 denotes a magnetization curve as measured along a direction perpendicular to a film, and the reference numeral 13 denotes a magnetization curve as measured along an in-plane direction. The Bi-substituted YIG garnet was formed on an amorphous quartz substrate by an aerosol deposition (AD) method. The film thickness was 5 micrometers. The deposition conditions will be described later in detail. The film was not subjected to annealing. It can be seen that magnetization occurred without annealing in the Bi-YIG film formed by the AD method. Furthermore, magnetization occurred in the in-plane direction even at a magnetic field of zero. A large magnetic field is required to align the magnetization in the perpendicular direction. Accordingly, it can be seen that this Bi-substituted YIG garnet film was an in-plane magnetization film. As the magneto-optical effects are proportional to the magnetization, this Bi-substituted YIG garnet film is expected to exert about half of the magneto-optical effects of a bulk.

FIG. 2 shows an X-ray diffraction pattern of the Bi-substituted YIG garnet. The reference numeral 21 denotes a diffraction pattern of the material powder, and the reference numeral 22 denotes a diffraction pattern of the film. All indexes indicated at diffraction peaks were indexes of the garnet structure. The diffraction peak of the film was located at the same position as that of the material powder. Therefore, it can be seen that the Bi-YIG film by the AD method was formed of polycrystal having a garnet structure. Thus, it is clear that a magneto-optical film formed by an aerosol deposition method can be formed without annealing by using a polycrystalline material having no lattice matching with an underlayer material.

FIG. 3 is a schematic view of an optical waveguide using a magneto-optical material according to the present example. An $SiO_2$ layer 32 of 3 µm was formed as a clad layer on a silicon substrate 31 by thermal oxidation. A blank having a width of 1.5 µm was formed in a resist in order to form a recessed structure for embedding a core layer. Then reactive ion etching was conducted. A core layer 33 was formed in the recessed structure having a depth of 1.5 µm by an aerosol deposition (AD) method. The deposition method will be described later in detail. Surface polishing was conducted so as to flatten the core layer. An $SiO_2$ layer having a film thickness of 1.5 µm was formed as an upper clad layer 34 above the core layer by thermal CVD. Finally, the waveguide was polarized in a longitudinal direction by a magnet, thereby aligning the magnetization direction of the waveguide into one direction. Since the magnetization direction of the waveguide is thus aligned into one direction, the magnetization direction of the optical waveguide can be aligned with a traveling direction of light passing through the waveguide without any magnet by the shape magnetic anisotropy. As a result, it is possible to obtain a waveguide operable without any magnet.

Next, an AD method as a deposition method used in the present example will be described in detail. FIG. 4 is a schematic view of a deposition apparatus used in the present invention. A gas cylinder 41 for storing an oxygen gas is connected to a glass bottle 42 via a carrier pipe. A powdery material 43 is supplied into the glass bottle 42, which is evacuated to a vacuum of about 20 Torr via a discharge pipe 44. Then oxygen as a carrier gas is introduced while a flow rate of oxygen is controlled. The glass bottle 42 is vibrated by a vibrator 45 so as to generate an aerosol in which fine particles of the material powder have been dispersed in a gas. The aerosol is transferred to a deposition chamber 47 via a carrier pipe 46 by the carrier gas. The deposition chamber 47 is evacuated to a predetermined degree of vacuum by a vacuum pump 48. The powder is blown to a substrate 410 from a nozzle 49, thereby forming a thin film.

The deposition conditions were as follows: The carrier gas was oxygen. An angle of incidence between the nozzle and the substrate was 10 degrees. The gas flow rate was 12 l/minute. The deposition rate was 0.5 µm/minute. The frequency of the vibrator was 200 rpm. Powder of Bi-substituted YIG garnet, which is an oxide that exerts great magneto-optical effects, was used as a deposition material. The composition of Bi-substituted YIG garnet (Bi-YIG) was $(Bi_{0.8}Y_{2.2})Fe_5O_{12}$. The average grain diameter of the material powder was 0.6 µm. The Bi-YIG powder as the deposition material has ferromagnetic composition that includes a garnet crystal structure and is applicable to an optical device that exerts great magneto-optical effects. The magnetization characteristics and the crystal structure of the Bi-YIG film formed by an AD method were as described in connection with FIGS. 1 and 2.

The nonreciprocity of an optical waveguide thus produced was measured. CW light having a wavelength of 1.55 µm was inputted, and the polarization direction of the light was aligned by a polarizer. Thereafter, the light was condensed by a lens and coupled to the waveguide. Light emitted from the waveguide was collimated into parallel light by a lens and then passed through an analyzer, where the intensity of light was measured by a photodetector. The magnetization direction of the waveguide was reversed by a magnet, and changes of the intensity of light were measured. As a result, an isolation value of 17 dB was obtained.

Thus, a waveguide of a magneto-optical material that exhibits no magnetic anisotropy due to inverse magnetostriction effects caused by thermal strain can be formed by using a polycrystalline material having no lattice matching with an underlayer material with an aerosol deposition method. With this configuration, a magneto-optical waveguide that exerts great magneto-optical effects and facilitates integration with other optical elements becomes practicable. This magneto-optical waveguide is applicable to optical devices such as a waveguide isolator, a polarization equalizer, and a circulator.

The fact that characteristics of an AD layer do not depend upon the crystallinity of an underlayer in essence is advantageous in that an optical element according to the present invention can be produced on a substrate on which other elements have been formed. For example, an optical element according to the present invention can be produced on a substrate on which another kind of optical elements including a laser, an electro-optic transducer, a photoelectric transducer, an optical amplifier, an optical waveguide, and an optical filter has been formed. Alternatively, an optical element according to the present invention can be produced on a substrate on which an integrated circuit including electronic elements such as a CPU and a memory has been formed. Thus, an optical element according to the present invention can be produced and integrated on a substrate on which other elements have been formed. The present invention can be applied in its entirety to production of an optical integrated device in which an optical device including an optical element according to the present invention and other devices are integrated.

As described above, the present invention pays attention to the fact that a control of magnetic anisotropy of a waveguide is important to manufacture a waveguide device of a magneto-optical material that is operable without any magnet on any desired underlayer material. When a waveguide is formed without annealing by using a magneto-optical material of a polycrystalline material having no lattice matching with an underlayer material, then magnetic anisotropy other than shape magnetic anisotropy can be reduced. Thus, the magnetization direction of an optical waveguide can be aligned with a traveling direction of light passing through the waveguide without any magnet by the shape magnetic anisotropy. The present invention has been made based on those findings.

The features of the present invention will be summarized below.

An optical device according to the present invention is characterized in that at least part of the optical device comprises an optical waveguide of a magneto-optical material. The magneto-optical material comprises a polycrystalline material having no lattice matching with an underlayer material. The optical waveguide exhibits no magnetic anisotropy due to an inverse magnetostriction effect caused by thermal strain. The magnetization direction of the optical waveguide is aligned with a traveling direction of light passing through the waveguide by shape magnetic anisotropy. When a waveguide is thus formed of a magneto-optical material, it is possible to reduce magnetic anisotropy other than shape magnetic anisotropy and to align the magnetization direction of the waveguide with a light waveguide direction.

The optical device according to the present invention is characterized in that a mechanical impact is applied to an ultra-fine brittle magneto-optical particulate material supplied onto a substrate so that the ultra-fine brittle magneto-optical particulate material is pulverized and bonded to each other for thereby forming a molded body. The optical waveguide of the magneto-optical material is formed of the molded body. The molded body comprises a polycrystalline material having no lattice matching with the underlayer material and exhibits no magnetic anisotropy due to an inverse magnetostriction effect caused by thermal strain. Therefore, it is possible to reduce magnetic anisotropy other than shape magnetic anisotropy.

The optical device according to the present invention is characterized in that no external magnetic field is applied to control the magnetization direction. The magnetization direction of the waveguide can be aligned with the light waveguide direction without any external magnetic field by reducing magnetic anisotropy other than shape magnetic anisotropy. Thus, any magnetic field generation mechanism such as a magnet is not required within or outside of the optical device. Therefore, it is possible to provide a small-sized and inexpensive optical device.

The optical device according to the present invention is characterized in that an aspect ratio (a ratio of a length to a width or a height) of the waveguide of the magneto-optical material is at least 10. When the waveguide has an aspect ratio of at least 10, it is possible to obtain shape magnetic anisotropy enough to align the magnetization direction with the waveguide direction.

The optical device according to the present invention is characterized in that the waveguide of the magneto-optical material comprises a channel waveguide. A channel waveguide has a columnar structure simpler than other waveguide structures such as a ridged waveguide. Therefore, a channel waveguide exhibits a large degree of shape magnetic anisotropy. Thus, it is possible to obtain shape magnetic anisotropy enough to align the magnetization direction with the waveguide direction.

The optical device according to the present invention is characterized in that the optical device comprises a waveguide isolator, a polarization equalizer, or a circulator. The magneto-optical material has properties of nonreciprocity and rotation of a polarization angle, which are not possessed by other materials. A waveguide isolator, a polarization equalizer, and a circulator are suitable for an optical device using such properties. Each of those optical devices requires control of the magnetization direction of a waveguide. Thus, it is effective to use the magneto-optical material according to the present invention.

The optical device according to the present invention is characterized in that the magneto-optical material comprises an oxide having a garnet structure. Magneto-optical materials practically used, including YIG, have a complex garnet structure. According to the present invention, the optical device can be formed on any desired substrate or underlayer material.

An optical integrated device according to the present invention can integrate the aforementioned optical device having an optical waveguide structure including a waveguide layer of the magneto-optical Material with another second optical device on a substrate. The second optical device comprises one of a laser, an electro-optic transducer, a photoelectric transducer, an optical amplifier, an optical switch, and an optical filter. The waveguide layer of the magneto-optical material can be formed on any desired substrate or underlayer material without the need of high-temperature heat treatment. Furthermore, the magnetization direction of the waveguide layer can be controlled without any magnet. Therefore, a plurality of optical devices can be integrated.

An optical integrated device according to the present invention is characterized in that the optical device having an optical waveguide structure including a waveguide layer of the magneto-optical material is integrated with an electronic circuit on a substrate. According to the present invention, an optical device can be integrated with an electronic circuit on the same substrate.

The optical integrated device according to the present invention is characterized in that the magneto-optical material comprises an oxide having a garnet structure. Magneto-optical materials practically used, including YIG, have a complex garnet structure. According to the present invention, the optical integrated device can be formed on any desired substrate or underlayer material.

A method of manufacturing an optical device or an optical integrated device according to the present invention is characterized in that the magneto-optical material is formed by an aerosol deposition method. With the aerosol deposition method, a magneto-optical material can be formed of a polycrystalline material having no lattice matching with an underlayer material so as to exhibit no magnetic anisotropy due to an inverse magnetostriction effect caused by thermal strain.

Although the present invention has been described based on the specific example, the present invention is not limited to the aforementioned example. It should be understood that various changes may be made therein without departing from the scope of this application. As a matter of course, those changes should be included in this application.

INDUSTRIAL APPLICABILITY

The present invention can provide a magneto-optical waveguide that exerts great magneto-optical effects and felicitates integration with other optical elements, an optical device using such a magneto-optical waveguide, and an optical integrated device obtained by integrating such a magneto-optical waveguide and an optical device with other optical elements and semiconductor optical elements.

The invention claimed is:

1. An optical device characterized in that at least part of the optical device comprises an optical waveguide of a magneto-optical material, the magneto-optical material comprises a polycrystalline material having no lattice matching with an underlayer material, the optical device exhibits no magnetic anisotropy due to an inverse magnetostriction effect caused by thermal strain, and a magnetization direction of the optical waveguide is aligned with a traveling direction of guided light passing through the waveguide by shape magnetic anisotropy.

2. The optical device as recited in claim 1, characterized in that a mechanical impact is applied to an ultra-fine brittle magneto-optical particulate material supplied onto a substrate so that the ultra-fine brittle magneto-optical particulate material is pulverized and bonded to each other for thereby forming a molded body, and the optical waveguide of the magneto-optical material is formed of the molded body.

3. The optical device as recited in claim 1, characterized in that no external magnetic field is applied to control the magnetization direction of the optical waveguide of the magneto-optical material.

4. The optical device as recited in claim 1, characterized in that an aspect ratio (a ratio of a length to a width or a height) of the optical waveguide of the magneto-optical material is at least 10.

5. The optical device as recited in claim 1, characterized in that the optical waveguide of the magneto-optical material comprises a channel waveguide.

6. The optical device as recited in claim 1, characterized in that the optical device comprises a waveguide isolator, a polarization equalizer, or a circulator.

7. The optical device as recited in claim 1, characterized in that the magneto-optical material comprises an oxide having a garnet structure.

8. An optical integrated device characterized in that the optical device having an optical waveguide structure including a waveguide layer of the magneto-optical material as recited in claim 1 is integrated with a second optical device on a substrate, and the second optical device comprises one of a laser, an electro-optic transducer, a photoelectric transducer, an optical amplifier, an optical switch, and an optical filter.

9. An optical integrated device characterized in that the optical device having an optical waveguide structure including a waveguide layer of the magneto-optical material as recited in claim 1 is integrated with an electronic circuit on a substrate.

10. The optical integrated device as recited in claim 8, characterized in that the magneto-optical material comprises an oxide having a garnet structure.

11. A method of manufacturing the optical device as recited in claim 1, characterized in that the magneto-optical material is formed by an aerosol deposition method.

12. The optical integrated device as recited in claim 9, characterized in that the magneto-optical material comprises an oxide having a garnet structure.

13. A method of manufacturing the optical integrated device as recited in claim 8, characterized in that the magneto-optical material is formed by an aerosol deposition method.

14. A method of manufacturing the optical integrated device as recited in claim 9, characterized in that the magneto-optical material is formed by an aerosol deposition method.

* * * * *